United States Patent [19]
Yanagawa

[11] 3,841,480
[45] Oct. 15, 1974

[54] CARD SELECTION FOR A CARD RETRIEVAL SYSTEM

[75] Inventor: Nobuyuki Yanagawa, Kanagawa-ken, Japan

[73] Assignee: Ricoh Co., Ltd., Tokyo, Japan

[22] Filed: June 21, 1973

[21] Appl. No.: 372,170

[30] Foreign Application Priority Data

June 21, 1972 Japan .............................. 47-61402

[52] U.S. Cl. .............................................. 209/80.5
[51] Int. Cl. ............................................. B07c 5/34
[58] Field of Search .................. 207/80.5, 100.5, 73

[56] References Cited

UNITED STATES PATENTS

| | | | |
|---|---|---|---|
| 3,565,086 | 2/1971 | Zimmermann | 133/8 R |
| 3,631,978 | 1/1972 | Hagan | 209/80.5 |
| 3,647,064 | 3/1972 | Rosenburgh | 209/80.5 |
| 3,670,885 | 6/1972 | Harlow | 209/80.5 |
| 3,785,486 | 1/1974 | Yanagawa | 209/80.5 |

*Primary Examiner*—Drayton E. Hoffman
*Assistant Examiner*—Thomas E. Kocovsky
*Attorney, Agent, or Firm*—Cooper, Dunham, Clark, Griffin & Moran

[57] ABSTRACT

Each card is provided along one of its sides with S sets of *n* coding bits, with each bit represented by a notch or by the absence of a notch at the bit position. The cards are coded in an *r*-out-of-*n* code, e.g., in a two-out-of-five code. A selector bar cooperates with each bit position, and the selector bars are moved between operative and inoperative positions by selector bar setting cams, one such setting cam provided for each set S of *n* bit positions. Each selector bar setting cam has *n* axially arranged cam elements, and the cam elements are circumferentially divided into N cam zones so that each cam zone comprises *n* coding positions. A subset *r* of the coding positions of each set of *n* coding positions are formed either as elevated or depressed areas of the circumferential cam surfaces and the rest of the *n* coding positions of each cam zone are formed either as depressed or elevated areas respectively. This arrangement allows selectively retrieving any desired card from a total of n.r.expS uniquely coded cards.

2 Claims, 5 Drawing Figures

CARD SELECTION FOR A CARD RETRIEVAL SYSTEM

BACKGROUND OF THE INVENTION

The invention is in the field of card selection in card retrieval systems and specifically relates to a card selection device for selecting and withdrawing a desired card from a collection of individually coded cards randomly stored in a card case.

There are various automated systems for selecting and retrieving a desired card from a stack of coded cards randomly arranged in a card storage case. The selection may rely on optical coding and optical means, mechanical coding and mechanical means or other types of coding and means. The subject invention is specifically in the field of card selection devices for mechanically selected desired cards from a randomly stored stack of cards each coded by notches along one or more selected sides of the card.

In one prior art type of mechanical card selection devices, each card is binarally coded with a set of coding bit positions, each bit position represented either by a notch or by the absence of a notch along a side of a card. For example, there may be a set of five coding bit positions, which would allow individually coding up to 32 cards. To select a desired card, five selector bars are provided, each aligned with one of the five bit positions along the card side. One or more of the selector bars aligned with the notches of a desired card are set at operative positions, while the remaining selector bars (if any) are at an inoperative position. Then the card case containing the randomly arranged set of cards and the selector bars are moved relative to each other so that the card having the notch arrangement corresponding to the selector bars in their operative positions is moved with respect to the remainder of the cards and can be withdrawn. One disadvantage of this type of a device is that more than one card may be selected in a single pass and further passes may be required for selecting only the single desired card. For example, if it is desired to select and withdraw only the card whose binary identification number is 10000, a first pass of the relative motion between the selector bars and the card case would select not only the desired card, but all other cards having a 1 in the leftmost bit position, and it would be necessary to carry out further passes in order to select only the card which has a 1 in the leftmost bit position and 0 in all other bit positions.

In order to obviate this disadvantage, proposals have been made to use two selector bars for each of the coding bit positions. For example, if there are five coding bit positions, there are 10 selector bars. The effect of this is that each coding bit position in effect can represent 01 or 10 and a desired card can be selected uniquely in a single pass. A disadvantage of this arrangement is that a more complex mechanism is required to control the selector bars, because a desired card is selected by in effect sensing the presence or absence of notches in ten positions, and the positions for sensing the notches are twice as wide as the positions of notches in the coding arrangement using one selector bar for each coding bit position.

In prior art card selection devices, the selector bars are individually controlled to move between an operative and an inoperative position by means of control buttons for control levers. Since the cards are coded in the binary system, these buttons or levers must be moved accordingly, although the cards are generally classified otherwise in the decimal system and a desired card is identified by a decimal number. This requires the use of a look-up table so that the buttons or levers of the prior art card selection devices can be set in accordance with the binary number corresponding to the desired decimal number identifying a desired card.

In view of the disadvantages of the prior art discussed above, and in view of the general desirability to provide automated selection of desired cards from a stack of randomly arranged cards, it is desirable to provide a card selection device which permits fast and unambiguous selection of a desired card, which is reasonably simple and efficient in construction and operation, and which avoids the possibility of errors inherent in translating decimal numbers to binary numbers by means of a look-up table.

SUMMARY OF THE INVENTION

The invention relates to card selection devices and specifically to selecting a desired card from a stack of randomly arranged cards. Each card has, along one or more of its sides, one or more sets of coding bit positions, each set consisting of $n$ bit positions and each bit position represented either by a notch or by the absence of a notch on the side of the card. The coding is of the $r$-out-of-$n$ type, where $r$ is a subset of $n$. In a typical case, there are two sets of five coding bit positions coded in a two-out-of-five code, with two bit positions of each set represented by notches. This allows uniquely coding up to 100 cards.

The cards are kept in a storage case, with the corresponding sets of coding bit positions of the cards aligned vertically and facing outwardly of the card storage case.

The card selection device includes a plurality of selector bars equal in number to the coding bit positions of each card. The selector bars are arranged with respect to each other as the bit positions of a card are arranged, such that each selector bar faces a bit position when the card storage case is brought in an operative position with respect to the selector bars. In the typical case discussed above, there are two sets of selector bars each consisting of five bars. A selector bar setting cam cooperates with each set of selector bars to selectively move each selector bar between an operative position and an inoperative position.

Each selector bar setting cam has $n$ axially arranged cam elements, and the circumferential surfaces of the cam elements are divided into N cam zones, so that each cam zone is divided axially into n coding positions. In each cam zone, $r$ coding position are formed as either elevated or depressed areas of the circumferential cam surfaces and the rest of the coding positions are formed as either depressed or elevated areas respectively. Rotating the selector bar setting cam determines which selector bars are moved to their operative positions and which selector bars are moved to their inoperative positions. In the example discussed above, there are two selector bar setting cams, each having five axially arranged cam elements, the cam elements of each setting cam divided into ten cam zones, with only two of the five coding positions in each cam zone being formed as either elevated or depressed areas and the remaining three of the cam positions being formed as either depressed or elevated areas respectively.

Each selector bar setting cam is provided with a turning dial and is provided with a click device for properly orienting the elevated and depressed areas of the cam elements with respect to the selector bars.

In operation, the card storage case is aligned with the selector bars such that each selector bar faces the coding bit position of the cards corresponding to it, and the card storage case is moved with respect to the selector bars along the direction of a stack of corresponding coding bit positions of the cards. The one or more cards which have notches in the coding bit positions corresponding to selector bars that are in their operative positions are moved with respect to the remainder of the cards in the storage case by means of a permanent magnet cooperating with magnetized areas of the cards, and can be withdrawn from the case.

One major advantage of the selection device discussed here is that only the desired card or cards are selected in a single pass of the card storage case with respect to the selector bars. An additional advantage is that a minimal number of selector bars and setting cam elements is used. A still additional advantage is that although the coding of the cards is a form of binary coding, an operator of the card selection device sets a decimally marked turning dial and need not refer to look-up tables.

DETAILED DESCRIPTION

Figure 1:
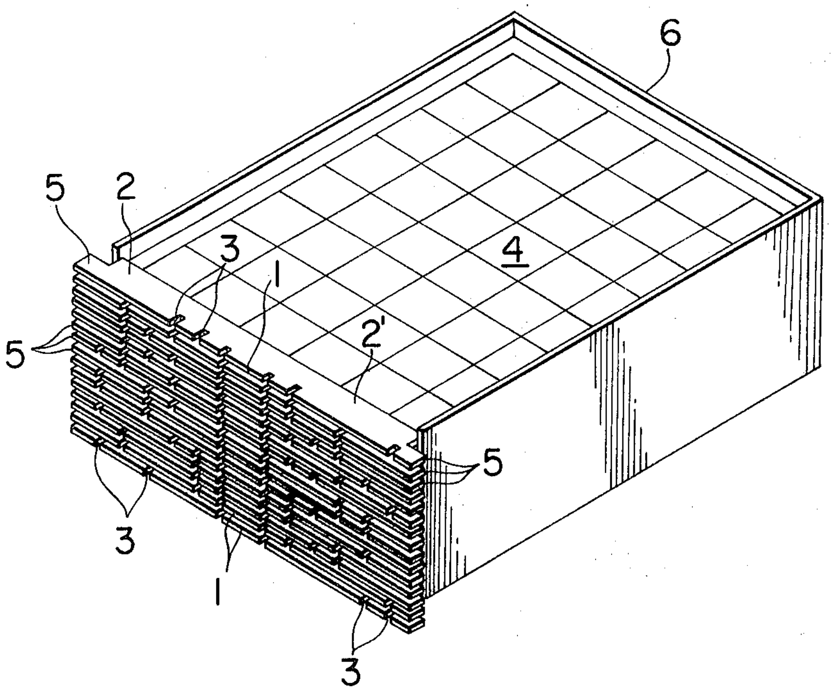
FIG. 1 is a perspective view of a stack of randomly arranged coded cards contained in a card storage case.

Referring to FIG. 1, a plurality of cards 4 are randomly stacked in a card storage case 6. Each of the cards 4 has a magnetic portion 1 which is approximately at the middle of one side edge thereof, and each of the cards 1 includes two sets of coding areas 2 and 2′ flanking the magnetic portion 1. Each of the coding areas 2 and 2′ comprises five coding bit positions, and two of these five coding bit positions are represented by notches 3, while the remaining three coding bit positions are not notched. Thus, each of the cards 4 has two notches 3 on either side of the magnetic portion 1. Each of the cards 4 has lugs 5 at the ends of the side that is notched, and the cards 4 are arranged with their notched edges facing outwardly of the storage case 6.

With this type of coding, up to 100 cards 4 may be uniquely coded. Each set of five coding bit positions coded in a two-out-of-five code is equivalent to 1 decimal digit, so that one of the coding areas 2 and 2′ may in effect correspond to one decimal digit for units and the other coding area may in effect correspond to another decimal digit for tens. This gives 100 different combinations ranging from 0 to 99.

It should be clear that each of the cards 5 may have a single coding area, or it may have more than two coding areas.

Figure 2:
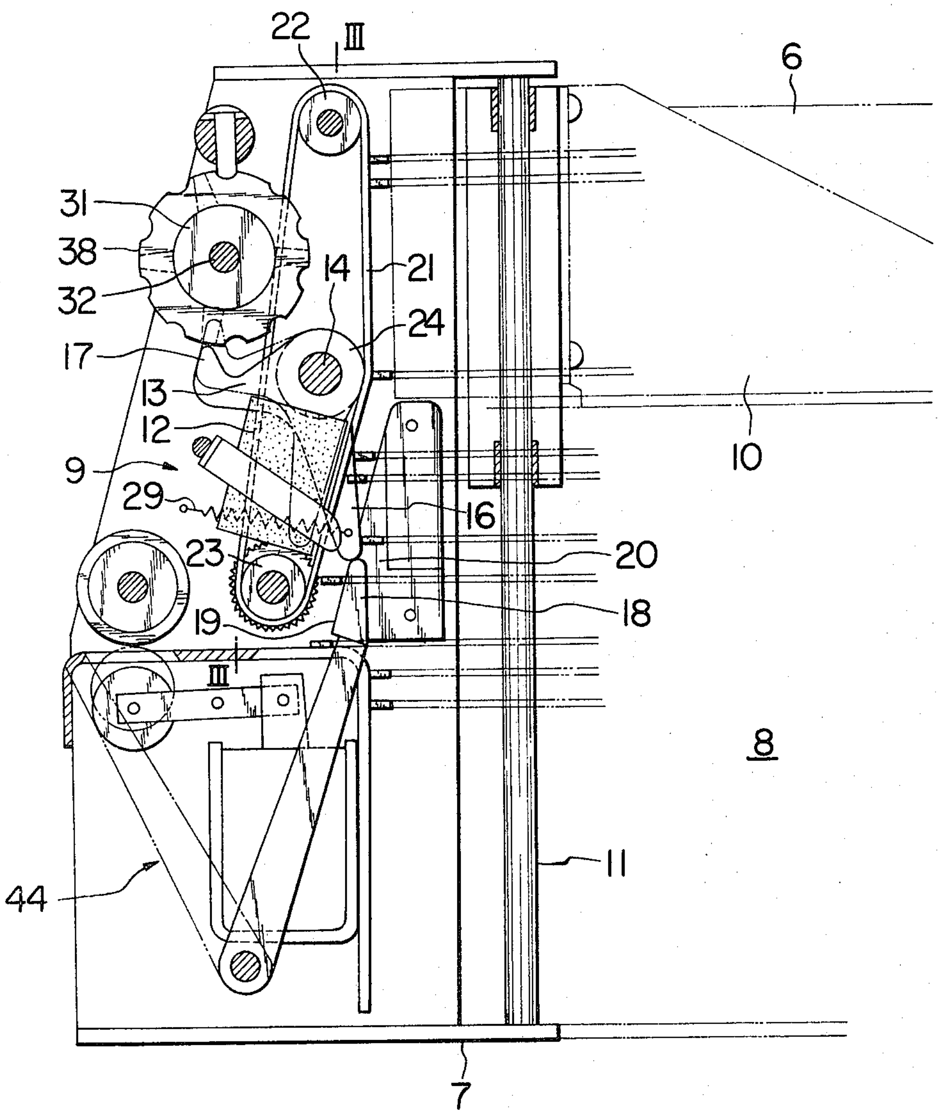
FIG. 2 is a side sectional view of a card selection device comprising an embodiment of the invention.

Referring to FIG. 2, a card selection device 7 may form a part of a readout device of a micro-reader or the like. The card selection device 7 is housed in a frame divided into a card storage case section 8, at the right-hand side of the figure, and a card selection section 9, at the left-hand side of the Figure. The card storage case section 8 includes a vertically moveable tray 10 which supports a card storage case 6 of the type shown in FIG. 1. The tray 10 moves vertically along guide rods 11 either manually or by means of a suitable motor and drive gear.

Figure 3:
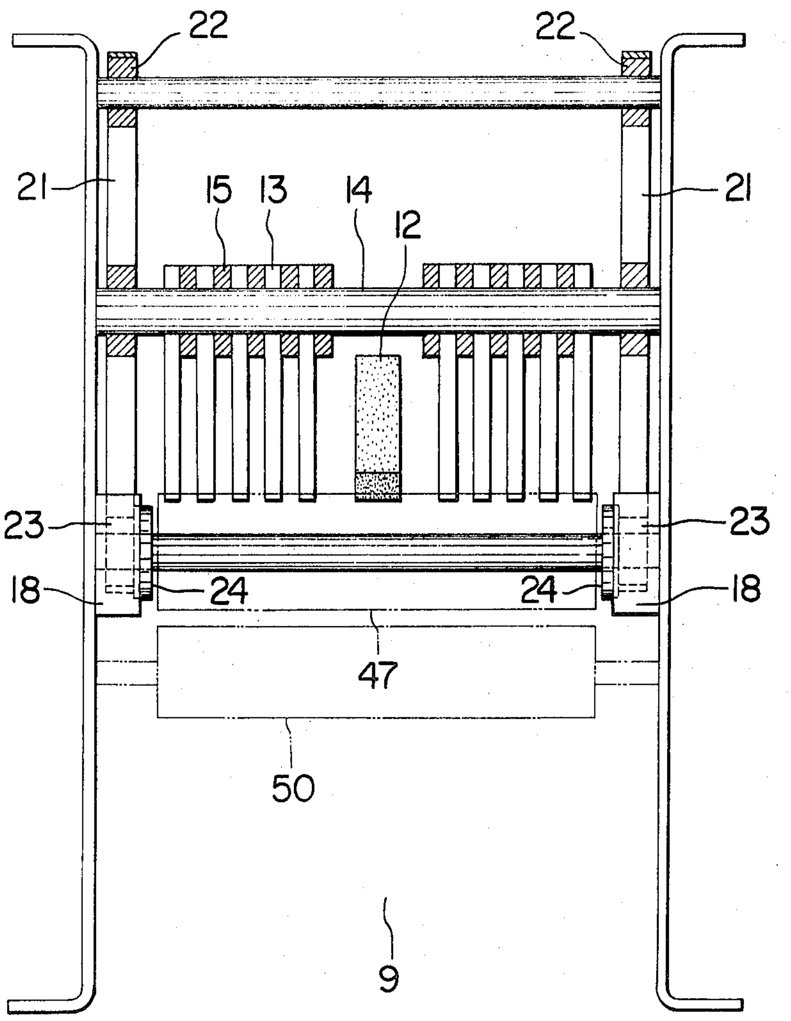
FIG. 3 is a sectional view taken along line III—III of FIG. 2.

The selection section 9 comprises a card extracting permanent magnet 12 disposed at a central position, facing and aligned with the magnetic portions 1 of the cards in the card storage case 6. A first set of five selector bars 13 is arranged on one side of the magnet 12 and a second set of the five selector bars 13 is arranged on the other side of the magnet 12, as shown in FIG. 3. The selector bars 13 are pivotally mounted on a rod 14 secured to a frame of the selection device 7. The selector bars 13 are uniformly spaced from each other by parting strips 15 and are arranged such that each selector bar 13 faces a different coding bit position of the cards 4 in the card storage case 6.

Figure 4:
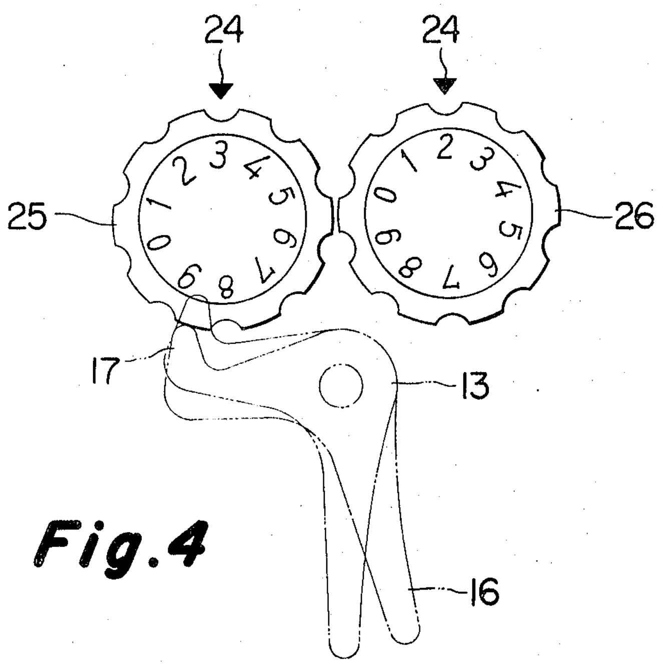
FIG. 4 is a plan view of code indication dials forming a part of the device of FIG. 2.

Each of the selector bars 13 comprises a selector arm 16 (see FIG. 4) and a sensing arm 17, each arm projecting from a central portion of the selector bar 13 at which the bar is pivotally supported by the rod 14. The sensing arms 17 of the selector bars 13 follow the circumferential surfaces of cams 27 and 28 to be placed thereby either in an operative position or in an inoperative position. As shown in FIG. 4, each selector bar 13 moves between an operative position, in which it is rotated counterclockwise, and a non-operative position, in which it is rotated clockwise.

If all selector bars 13 are at their inoperative positions, and the card case 6 is moved vertically as shown in FIG. 2, all cards 4 would be attracted to the card extracting magnet 12. When one or more selector bars 13 are at their operative positions, all cards 4 are prevented from being extracted by the magnet 12, except those cards 4 which have notches at the bit positions corresponding to the selector bars 13 that are at their operative positions. Thus, when the card case 6 starts moving downwardly from its topmost position in FIG. 2, only one or more selected cards 4 would be allowed to be attracted by the magnet 12 as the card case 6 is moving downwardly, and only the cards attracted to the magnet 12 would be withdrawn leftwardly from the stack of cards as the card case 6 is moving downwardly. Those selected cards engage with their lugs 5 the leftwardly facing guide surfaces 19 of a pair of separators 18 to be pulled thereby further leftwardly. The bottommost card 4 from the card case 6 which is pulled leftwardly by the magnet 12 and by the separators 18 is then withdrawn leftwardly by a withdrawing device 44 disposed below the selection section 9. Since the withdrawal device 44 does not form a part of the subject invention, it is not disclosed in detail in this specification.

In order to move the cards 4 downwardly in FIG. 2, together with the downward movement of the card case 6, a pair of endless belts 21 are disposed at the front end back ends of the device, as viewed in FIG. 2, and are trained over pulleys 22 and 23. Another pulley 24 is mounted between the pulleys 22 and 23 to deflect the belts 21 so that the cards 4 are moved in a downward direction parallel to the direction of movement of the card case 6 until the cards reach a position at which they face and are adjacent to the magnet 12. Then, those selected cards 4 which are allowed by the selector bars 13 to contact the magnet 12 ride along its right facing surface to be thereby partly withdrawn from the case 6 and to thereby engage the separators 18. The rollers 22 and 23 are rotatably supported by the frame of the selection device 7 and are driven by a suitable drive which is not shown.

Figure 5:
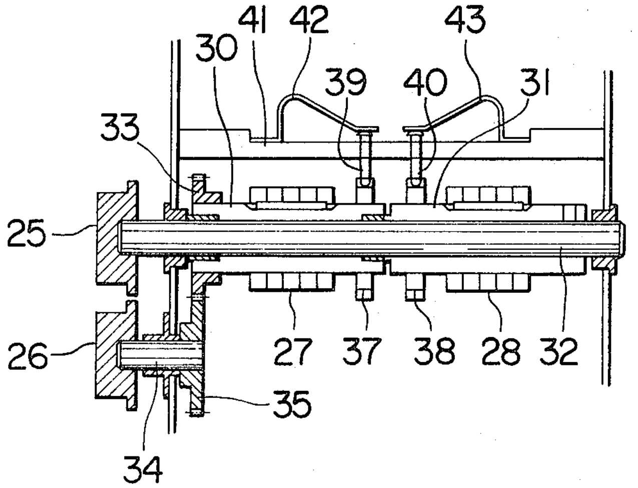
FIG. 5 is a partial sectional view of the card selection device of FIG. 2.

Dials 25 and 26 which are shown in FIG. 4 are used for selecting the desired card or cards which are to be withdrawn. The dials 25 and 26 are rotatably supported by the frame of the selection device 7 as shown in FIG. 5. The dial 25 selects the tens of a two digit decimal number and the dial 26 selects the units of the same two digit decimal number. Each of the dials 25 and 26 is marked with the digits 0 to 9 arranged circumferentially around its leftwardly facing side in FIG. 5. The code number of a desired card or cards is indicated by aligning the arrows 24 of FIG. 4 wwth the desired digit on the dials 25 and 26. The indicated code number in FIG. 4 is 32.

The dials 25 and 26 drive cam shafts 31 and 30 respectively to thereby set desired selector bars 13 at their operative positions. Referring to FIG. 5, the cam shaft 30 is loosely mounted over a shaft 32 for rotation relative thereto, and a cam shaft 31 is secured to the shaft 32, for example, by set screws, for rotation therewith. A cam 27 is secured to the cam shaft 30, for example, by keying, and a cam 28 is similarly secured to the cam shaft 31. The dial 25 is secured to the left end of the shaft 32 to thereby rotate the shaft 32, the cam shaft 31 and the cam 28, while the dial 26 is secured to the left end of a short shaft 34 which carries at its right-hand end a gear 35 meshing with a gear 33 secured to the cam shaft 30 to thereby rotate the cam 27. The ratio of the gears 35 and 33 is 1:1. The cams 27 and 28 may be mounted on separate shafts depending on the size of the cams and on the shape of the selector bars.

The cams 27 and 28 each have their circumferential surfaces divided into five axially arranged cam elements each corresponding to one coding bit position. Alternately, the cams 27 and 28 may each comprise five separate and axially arranged cams.

Each of the cam elements of the cams 27 and 28 are formed around their circumference with elevated and depressed areas. The sensing arms 17 of the selector bars 13 are maintained in pressing engagement with these elevated and depressed areas of the cams 27 and 28 by the biasing forces of springs 29 (FIG. 2). In the illustrated embodiment of the invention, the selector bars 13 whose sensing arms 17 are in engagement with the elevated areas of the cams 27 and 28 are at their operative positions, while the selector bars 13 whose sensing arms 17 are in engagement with the depressed areas of the cams 27 and 28 are at their inoperative positions.

The five cam elements of each of the cams 27 and 28 are divided into ten circumferentially arranged cam zones, so that each cam zone is divided into five coding bit positions. The coding bit positions in each cam zone are represented by a depressed area or an elevated area according to whether the binary bit in the particular coding bit position is to indicate a 0 or a 1.

For example, when the coding system is a two-out-of-five code, two out of the five selector bars 13 forming a set should be at their operative positions. Thus, each of the 10 ones must have two elevated areas and three depressed areas. It should be clear, however, that the same effect may be reached by using a cam zone represented by two depressions and three elevations.

One example of the arrangement of the coding bit position at which elevations are formed is shown at Table 1 below.

Table 1

| Code No. | No. 1 Cam Element | No. 2 Cam Element | No. 3 Cam Element | No. 4 Cam Element | No. 5 Cam Element |
|---|---|---|---|---|---|
| 0 | 0 | 0 | | | |
| 1 | | | 0 | 0 | |
| 2 | 0 | | | | 0 |
| 3 | | 0 | | 0 | |
| 4 | | | 0 | | 0 |
| 5 | 0 | | | 0 | |
| 6 | | 0 | 0 | | |
| 7 | | | | 0 | 0 |
| 8 | 0 | | 0 | | |
| 9 | | 0 | | | 0 |

Elevations are formed at the bit positions marked with 0 in table 1 above. Instead of forming elevations, depressions may be formed in the indicated positions. The cam elements of the cams 27 and 28 shown in FIG. 1 may be referred as numbers 1 through 5 when counting from left to right. It should be clear that if the relationships between the code numbers and the coding positions on the cards are changed, the shape and configuration of the cam elements should be changed accordingly.

In operation, the dials 24 and 26 are turned to indicate the desired 2 digit decimal number of the card which is to be selected. At the selected positions of the dials 25 and 26, the cam elements of the cams 27 and 28 set to their operative positions the selector bars 13 which correspond to the selected decimal number in a two-out-of-five binary code. For example, if the decimal number 32 is selected as shown in FIG. 4, the second and fourth cam elements of the cam 28 are set to their operative positions, and the first and fifth cam elements of the cam 27 are set at their operative positions. Then, the card case 6 is moved downwardly from its topmost position as viewed in FIG. 2, and only those cards that have notches at the coding bit positions corresponding to the selector bars 13 that are at their operative positions are allowed to be withdrawn leftwardly by the magnet 12 as the card case 6 is moving downwardly.

In order to maintain the cams 27 and 28 at their selected positions, and in order to ensure that the sensing arms 17 of the selector bars 13 are aligned with the proper portions of the selected elevations and depressions, each of the cams 27 and 28 cooperates with click means comprising a click cam, a click pin and a spring. Thus, the cam shaft 30 which carries the cam 27 also carries a click cam 37 which has around its circumference ten depressions aligned with the correspondingly numbered depressions of the dial 25 with the correspondingly numbered depressions and elevations of the cam 27. A click pin 39 is biased downwardly by a spring 42 such that its rounded lower end bears against a depression of the click cam 37 to hold the click cam at its selected position. The spring 42 is secured to a click guide bar 41 which in turn is secured to the frame of the selection device 7. A similar click cam 38 is secured to the cam shaft 31 which carries the cam 28. The click cam 38 cooperates with a similar click pin 40 which is biased downwardly by a similar spring 42 secured to the bar 41.

In operation, when either of the dials 25 and 26 is turned by hand, and then released, the dial settles at a position at which one of the digits marked on it is exactly against the pointer 24, and at which either a depression or an elevation of each cam element of the cams 27 and 28 is exactly against the tip of the portion 17 of each selector bar 13.

While only two sets of selector bars and two sets of coding bit positions have been discussed in connection with the illustrated embodiment of the invention, it should be clear that a single set of selector bars and a corresponding single set of coding bit positions may be used, and that similarly more than two sets of selector bars and coding bit positions may be used.

I claim:

1. A card selection device for selecting a desired card from a randomly stacked set of cards each coded with a set of coding bits at coding bit positions disposed along a side edge of the card, each coding bit represented by either a notch or the lack of a notch at its bit position, each set of coding bits comprising $n$ bits of which a subset comprising $r$ bits are represented by notches, comprising a set of selector bars equal in number to the coding bits forming said set of coding bits and adapted to cooperate with the notches in the cards to select a desired card, a selector bar setting cam for moving selected bars between operative and inoperative positions to set selected bars at selected positions depending on the code number of the card to be selected, said selector bar setting cam having its peripheral surface divided into $n$ cam elements arranged axially along the setting cam, said $n$ cam elements having their peripheral surfaces divided into N cam zones arranged peripherally of the setting cam so that each cam zone is divided into $n$ coding positions, $r$ coding positions out of the $n$ coding positions of each cam zone being formed as either elevated or depressed areas and the rest of the coding positions of each cam zone being formed as either depressed or elevated areas respectively, whereby N cards can be selected uniquely by selecting a desired angular position of said selector bar setting cam.

2. A card selection device for card selection and retrieval apparatus for use with a plurality of cards coded according to a coding system wherein each card is provided with a coding area comprising a set of $n$ coding bits of which $r$ bits are represented each by a notch in a side of the card, comprising a set of selector bars equal in number to the coding bits of the card and aligned therewith, a selector bar setting cam adapted to moe the selector bars between operative and inoperative positions thereof and to set selected bars at selected positions according to the code number of a card desired to be selected, at least one dial having its peripheral surface divided into N areas and marked with N digits and connected to said selector bar setting cam to rotate the same angularly, and click means comprising a rotatable click cam formed on its peripheral surface with N valleys, a click pin resiliently urged into engagement with said valleys on the peripheral surface of the click cam to control the angular position thereof, means to secure the click cam to the selector bar setting cam for rotation therewith, said selector bar setting cam having its peripheral surface divided into $n$ cam elements arranged axially of the setting cam, said $n$ cam elements having their peripheral surfaces divided into N cam zones arranged peripherally of the setting cam so that each cam zone is divided into $n$ coding positions, $r$ coding positions out of the $n$ coding positions of each cam zone being formed as elevated or depressed areas and the rest of the coding positions of each cam zone being formed as depressed or elevated area respectively, whereby N cards can be uniquely selected by controlling the angular position of said selector bar setting cam.

* * * * *